United States Patent
Li et al.

(10) Patent No.: US 12,554,486 B2
(45) Date of Patent: Feb. 17, 2026

(54) CONTROLLER-RESOURCE OBJECT TOPOLOGY ANALYSIS FOR CLUSTER CONFIGURATION MANAGEMENT

(71) Applicant: International Business Machines Corporation, Armonk, NY (US)

(72) Inventors: Peng Li, Xian (CN); Guangya Liu, Cary, NC (US); Xun Pan, Xian (CN); Hai Hui Wang, Xian (CN); Xiang Zhen Gan, Xian (CN); Jin Chi He, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 18/214,184

(22) Filed: Jun. 26, 2023

(65) Prior Publication Data
US 2024/0427574 A1     Dec. 26, 2024

(51) Int. Cl.
*G06F 8/71*     (2018.01)
*G06F 8/41*     (2018.01)
*G06F 9/50*     (2006.01)

(52) U.S. Cl.
CPC .......... *G06F 8/71* (2013.01); *G06F 8/41* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 6,088,727 A | * | 7/2000 | Hosokawa | ............ G06F 11/202 709/225 |
| 11,409,568 B2 | | 8/2022 | Jiang et al. | |

(Continued)

FOREIGN PATENT DOCUMENTS

| | | |
|---|---|---|
| CN | 114925242 A | 8/2022 |
| CN | 115357369 A | 11/2022 |

OTHER PUBLICATIONS

Banks, Ian, "Kubectl commands—a comprehensive guide," Apr. 6, 2022, <https://www.civo.com/learn/kubectl-commands-a-comprehensive-guide>, p. 1-11. (Year: 2022).*

(Continued)

*Primary Examiner* — Qing Chen
(74) *Attorney, Agent, or Firm* — Garg Law Firm, PLLC; Rakesh Garg; Rakesh Roy

(57) ABSTRACT

An embodiment causes inserting, into kernel code of an operating system, during execution of the operating system, a traffic monitoring code module. An embodiment extracts, using the traffic monitoring code module, from a plurality of messages between components of a cluster management system managing a first cluster of systems, a first message relating to a resource object, the resource object representing a resource within the first cluster of systems, the traffic monitoring code module triggered by receipt of each of the plurality of messages at a socket of the kernel code. An embodiment constructs, using the first message, a controller-resource object topology, the controller-resource object topology identifying a relationship between the resource object and a controller associated with the resource object.

20 Claims, 7 Drawing Sheets

(56) References Cited

U.S. PATENT DOCUMENTS

| | | | | |
|---|---|---|---|---|
| 2004/0249984 | A1* | 12/2004 | Das | G06F 9/505 |
| | | | | 709/249 |
| 2007/0277179 | A1* | 11/2007 | Suzuka | G06F 9/544 |
| | | | | 719/313 |
| 2016/0005016 | A1* | 1/2016 | Eliahu | G06Q 20/1235 |
| | | | | 705/44 |
| 2016/0270021 | A1* | 9/2016 | Wu | H04W 60/04 |
| 2020/0244770 | A1* | 7/2020 | Cooley | H04L 41/5054 |
| 2021/0026611 | A1* | 1/2021 | Bequet | G06F 16/90344 |
| 2021/0303365 | A1* | 9/2021 | Li | G06F 9/5066 |
| 2021/0311764 | A1* | 10/2021 | Rosoff | G06F 9/44505 |
| 2022/0107842 | A1* | 4/2022 | Jiang | G06F 9/5061 |
| 2022/0229686 | A1* | 7/2022 | Jain | G06F 9/4881 |
| 2023/0023744 | A1 | 1/2023 | Verma et al. | |
| 2024/0039982 | A1* | 2/2024 | Merwaday | H04L 67/10 |
| 2024/0419457 | A1* | 12/2024 | Wang | G06F 9/44505 |

OTHER PUBLICATIONS

Kubevela, Resource Relationships, 2023, https://kubevela.io/docs/reference/topology-rule.

Kubernetes, Using eBPF in Kubernetes, Dec. 7, 2017, https://kubernetes.io/blog/2017/12/using-ebpf-in-kubernetes/.

* cited by examiner

CONTROLLER-RESOURCE OBJECT TOPOLOGY ANALYSIS FOR CLUSTER CONFIGURATION MANAGEMENT

BACKGROUND

The present invention relates generally to computer system cluster configuration management. More particularly, the present invention relates to a method, system, and computer program for controller-resource object topology analysis for cluster configuration management.

Application containerization is the packaging of software code (an application) with just the operating system libraries and dependencies required to run the code to create a single lightweight executable—a container. Because containers are not dependent on a particular host operating system, containerized applications are portable and able to run uniformly and consistently across different hardware platforms and cloud environments. Because containers are more portable and resource-efficient than virtual machines, containers are often used in implementing applications in a cloud environment. A complex application is broken up into a group of smaller, more specialized services or microservices, each with its own database and its own business logic. Microservices communicate with each other across common interfaces. Microservices are often containerized.

Kubernetes is open source software for configuring and managing, in an automated manner, containerized applications and services. (Kubernetes is a registered trademark of the Linux Foundation in the United States and other countries.) A Kubernetes cluster is referred to as a cluster herein, unless expressly disambiguated. A cluster includes one or more computer systems, also referred to as worker machines, worker nodes, or nodes, that run portions of one or more containerized applications. Every cluster has at least one worker node. Worker node(s) host pods that are the components of the application workload. A pod is a group of one or more containers, with shared storage and network resources, and a specification for how to run the containers. A control plane manages worker nodes and pods in a cluster. The control plane's components make global decisions about the cluster, and detect and respond to cluster events. Control plane components can execute on any computer system in a cluster.

An application program interface (API) server, a component of the Kubernetes control plane, exposes a hypertext transfer protocol (HTTP) API that lets end users, portions of a Kubernetes cluster, and external components communicate with one another. In particular, the API server implements a RESTful API (an API conforming to the design principles of the REST, or representational state transfer architectural style) over HTTP. REST APIs communicate via HTTP requests to perform standard database functions, for example using an HTTP GET request to retrieve a record, a POST request to create a record, a PUT request to update a record, and a DELETE request to delete a record. The API server within Kubernetes performs all API operations, and is responsible for storing API objects into a persistent storage backend. Supported API operations include querying and manipulation of the state of API objects, each representing an element in an overall state of a cluster. API objects describe which containerized applications are executing in which nodes, resources available to those applications, and policies governing those applications' behavior. Most API objects include a field describing the object's desired state and current state.

A resource object, in the Kubernetes API, stores a collection of API objects of a certain kind. For example, the built-in pods resource stores a collection of pod objects. Thus, a resource object represents a resource that Kubernetes manages. A resource object includes a field that represents a desired state of the object. A controller, as used herein, unless expressly disambiguated, monitors at least one resource object, and is responsible for making the resource object's current state (and thus, the resource represented by the resource object) come closer to a desired state. Typically, a controller uses one kind of resource object as its desired state, and manages a different kind of resource object to make the desired state happen. For example, a controller for Kubernetes jobs tracks job objects (to discover new work) and creates and tracks pod objects (to run the jobs and monitor for work completion). Kubernetes includes a set of built-in controllers.

A custom resource object is an extension of the Kubernetes API that is not necessarily available in a default Kubernetes installation. A custom resource object is defined using the CustomResourceDefinition API resource, and thus a custom resource object is referred to herein as a CRD object or a CRD.

As used herein (and in Kubernetes), a webhook is an event notification via an HTTP POST method. An HTTP POST method requests that a server accept the data enclosed in the body of the request message. An admission controller is a portion of software code, typically implemented as a webhook, that intercepts an authenticated request to the Kubernetes API server, and is able to change or deny the request. Thus, an admission controller webhook implements custom logic to be executed whenever resources are created, updated, or deleted in a Kubernetes cluster. A mutating admission controller is allowed to modify API objects.

SUMMARY

The illustrative embodiments provide for controller-resource object topology analysis for cluster configuration management. An embodiment includes causing inserting, into kernel code of an operating system, during execution of the operating system, a traffic monitoring code module. An embodiment includes extracting, using the traffic monitoring code module, from a plurality of messages between components of a cluster management system managing a first cluster of systems, a first message relating to a resource object, the resource object representing a resource within the first cluster of systems, the traffic monitoring code module triggered by receipt of each of the plurality of messages at a socket of the kernel code. An embodiment includes constructing, using the first message, a controller-resource object topology, the controller-resource object topology identifying a relationship between the resource object and a controller associated with the resource object. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
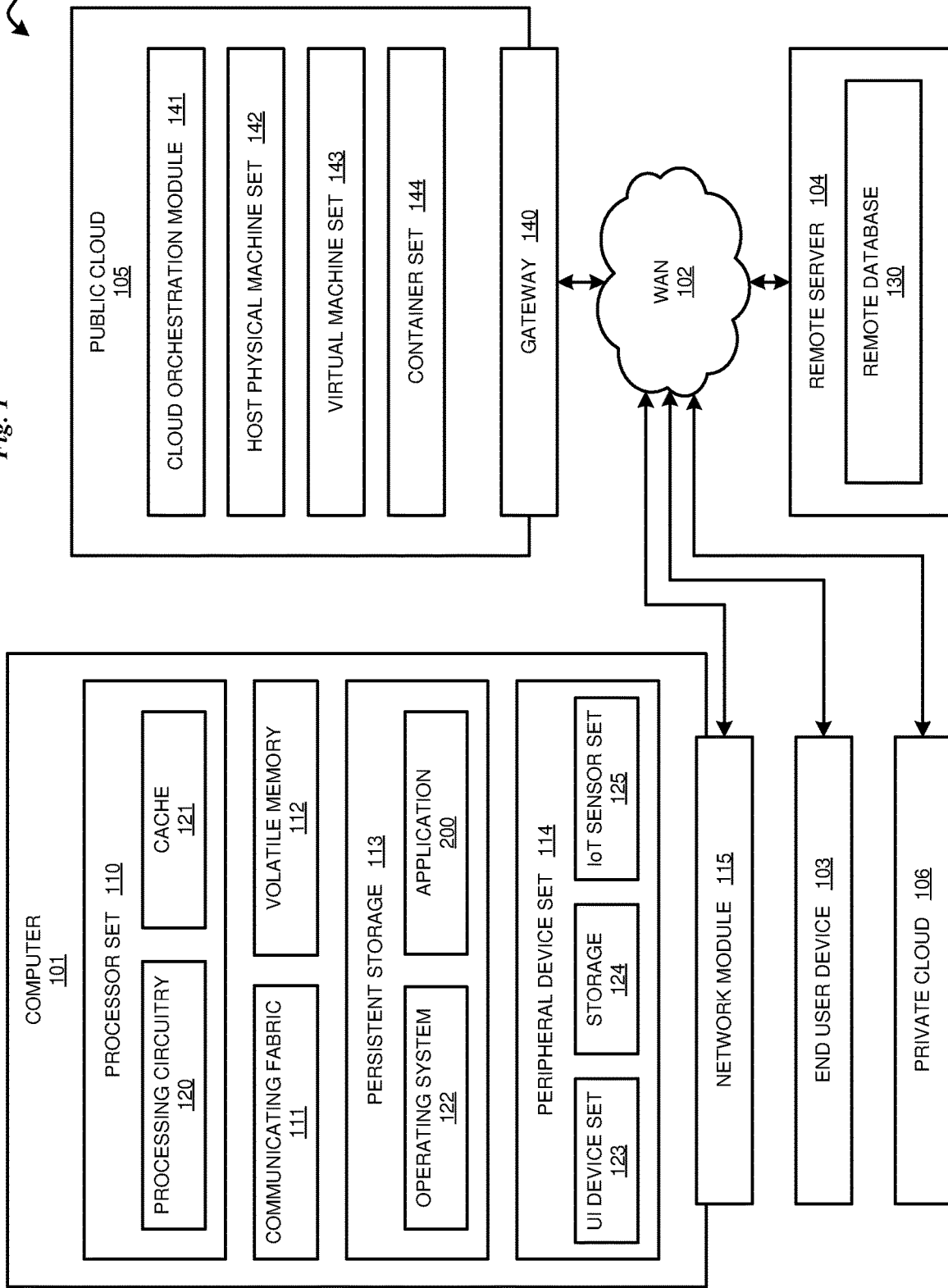
FIG. 1 depicts a block diagram of a computing environment in accordance with an illustrative embodiment.

The illustrative embodiments recognize that the use of custom resource objects defined as CRDs is becoming popular in presently available cluster management software implementing Kubernetes functionality. However, although Kubernetes controllers are configured to monitor resources represented by CRDs, links between controllers and the CRDs they monitor are typically defined in the cluster management software that includes the CRDs. These links are not visible to cluster administrators without examining documentation or source code of the application in which a CRD might be defined. The relevant documentation or source code is not always available, and documentation might be incomplete or not include subsequent changes to the source. Even a CRD definition within source code might not include all controller-CRD relationships. Source code is also difficult for administrators to understand and use in cluster administration, error analysis, and error remediation. Further, several controllers might monitor the same CRD, so without knowledge of links between controllers and the CRDs they monitor, it is difficult for administrators to trace changes to CRD state and which controller was responsible for a particular CRD state change. Further, without links between a specific controller and the resource objects the controller monitors, it is difficult to ensure that migration of a live Kubernetes environment includes all the relevant controllers, their resource objects, and the resources represented by resource objects. Thus, the illustrative embodiments recognize that there is a need to identify relationships between CRDs and controllers and monitor CRD state changes to link a state change to a specific controller.

The illustrative embodiments also recognize that, although the need to identify relationships between CRDs and controllers and monitor CRD state changes exists in Kubernetes environments, Kubernetes environments are used herein only as an example, and the need exists in other computer cluster management implementations. Thus, the present disclosure is also not limited to Kubernetes environments or any particular cluster management implementation.

The present disclosure addresses the deficiencies described above by providing a process (as well as a system, method, machine-readable medium, etc.) that inserts a traffic monitoring code module into kernel code of an operating system, uses the traffic monitoring code module to extract, from a plurality of messages between components of a cluster management system managing a first cluster of systems, a first message relating to a resource object, and uses the first message to construct a controller-resource object topology identifying a relationship between the resource object and a controller associated with the resource object.

The illustrative embodiments provide for controller-resource object topology analysis for cluster configuration management.

An embodiment inserts, or causes insertion of, a traffic monitoring code module into kernel code of an operating system. One embodiment uses an eBPF capability within an operating system to insert, during execution of the operating system, a traffic monitoring code module into kernel code of an operating system that supports eBPF. eBPF is a presently available software technique that extends the capabilities of a Linux kernel without requiring loading of kernel modules or changing kernel source code. (eBPF is a registered trademark of eBPF Foundation in the United States and other countries.) An application developer can use an eBPF program to add additional capabilities to an operating system at runtime. The operating system uses a Just-In-Time (JIT) compiler and verification engine to execute an eBPF program, providing similar safety and execution efficiency to existing Linux kernel code. eBPF programs are event-driven and are run when the kernel or an application passes a certain hook point. Pre-defined hooks include system calls, function entry/exit, kernel tracepoints, network events, and others. Another embodiment uses a presently available code development technique to insert a traffic monitoring code module into kernel code of an operating system prior to execution of the operating system.

An embodiment uses the traffic monitoring code module to receive a plurality of messages between components of a cluster management system managing a first cluster of systems, and extract a message of interest from the plurality of messages. In particular, an embodiment uses a presently available technique, such as an eBPF capability, to register the traffic monitoring code module for execution when triggered by receipt of a message at a socket of the kernel. In one embodiment, the traffic monitoring code module, when triggered, examines an incoming message to determine if the message is of interest. In another embodiment, the traffic monitoring code registers to receive all incoming messages, or all incoming messages matching one or more criteria, at a socket of the kernel, and the traffic monitoring code module examines an incoming message to determine if the message is of interest. In one embodiment, the cluster management system is Kubernetes, and the plurality of messages are HTTP messages between the Kubernetes API server and other Kubernetes objects.

In an embodiment, one message of interest is a resource creation message. A resource creation message is a request to create a resource object. The request identifies a controller that will monitor the resource object. For example, in Kubernetes a resource creation message might be a message from an API server to a mutation webhook.

In an embodiment, one message of interest is a resource status message. A resource status message is a request from a controller for a current status of a resource. The current status of the resource is recorded in the resource object. Two non-limiting examples of a resource status message are the Kubernetes get command (used in the Kubernetes API to request a status of a single resource object) and the Kubernetes list command (used in the Kubernetes API to request a status of each of a collection of resource objects). For example, one Kubernetes get command might be ""GET/api/v1/configmaps/{CM name}", where {CM name} specifies a particular resource represented by a resource object.

In an embodiment, one message of interest is a watch message. A watch message is a request from a controller to report one or more changes in status of a resource represented by a resource object, without a specific request for status. One non-limiting example of a watch message is the Kubernetes watch command (used in the Kubernetes API to request reporting of a sequence of status changes to a particular resource object or collection of resource objects. For example, one Kubernetes watch command might be "GET/api/v1/watch/{CRD name}", where {CRD name} specifies a particular CRD.

In an embodiment, one message of interest is a resource state change message. A resource state change message is a request from a controller to change a status of a resource, as recorded in a resource object representing the resource, from a first status to a second status. An embodiment uses the contents of one or more resource state change messages to log, in a resource state change log, an identifier of the controller, an identifier of the resource object, the first status, and the second status.

An embodiment uses one or more extracted messages of interest to construct a controller-resource object topology. A controller-resource object topology identifies a relationship between a resource object and a controller associated with the resource object. A controller associated with the resource object is a controller that has created a resource object, or has requested a status of a resource object either once or on a continuing basis. An embodiment provides the topology to a human expert for use in cluster administration, error analysis, and error remediation. Another embodiment uses the topology to perform automatic cluster administration, error analysis, and error remediation. One embodiment uses the topology in migrating the controller and the resource represented by the resource object from the first cluster of systems to a second cluster of systems managed by a second cluster management system. In particular, if the controller is being migrated, the embodiment ensures that the resource represented by the resource object is also migrated, and if the resource is being migrated, the embodiment ensures that the controller is also migrated, thus preserving the controller-resource object relationship across the migration.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an application 200 that provides controller-resource object topology analysis for cluster configuration management. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
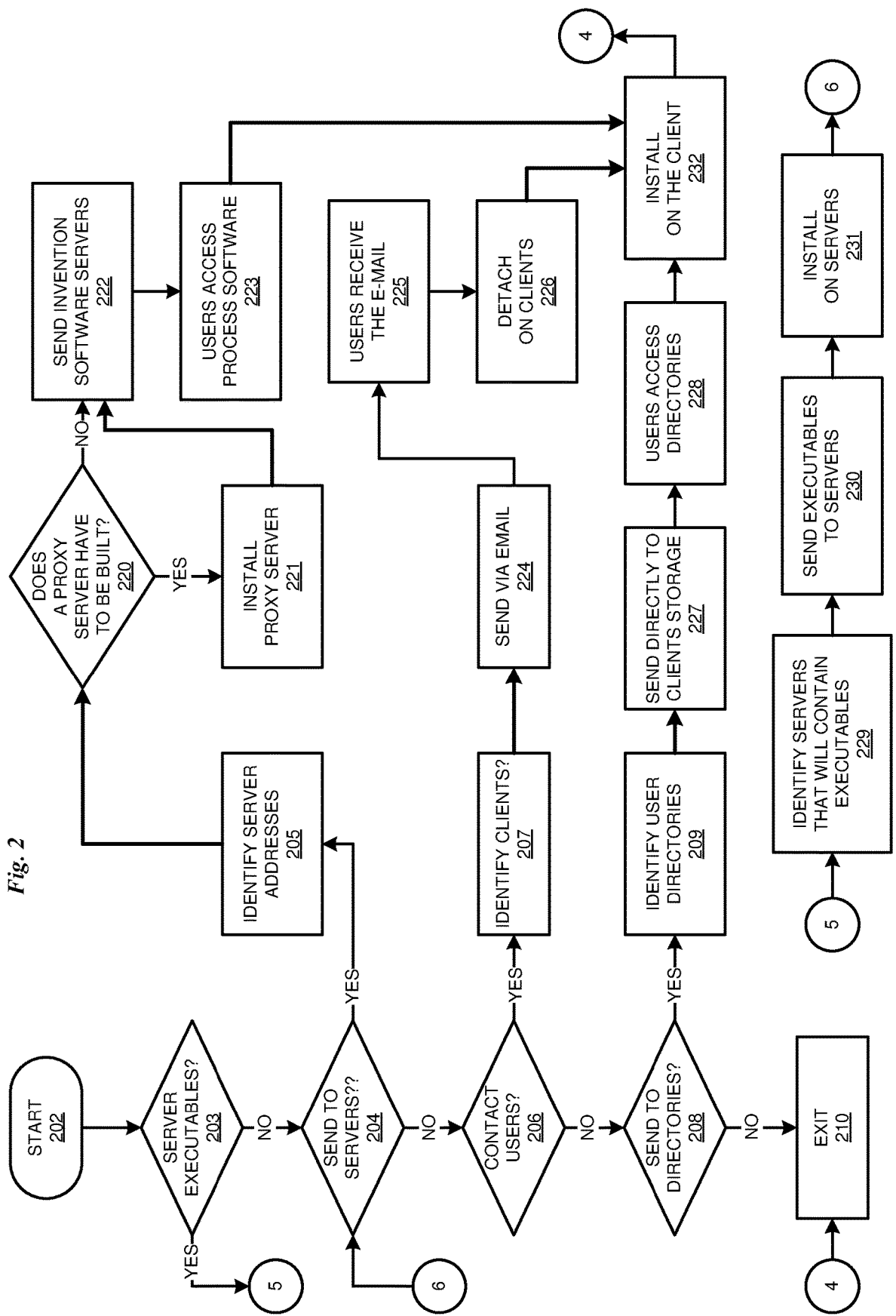
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing controller-resource object topology analysis for cluster configuration management may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
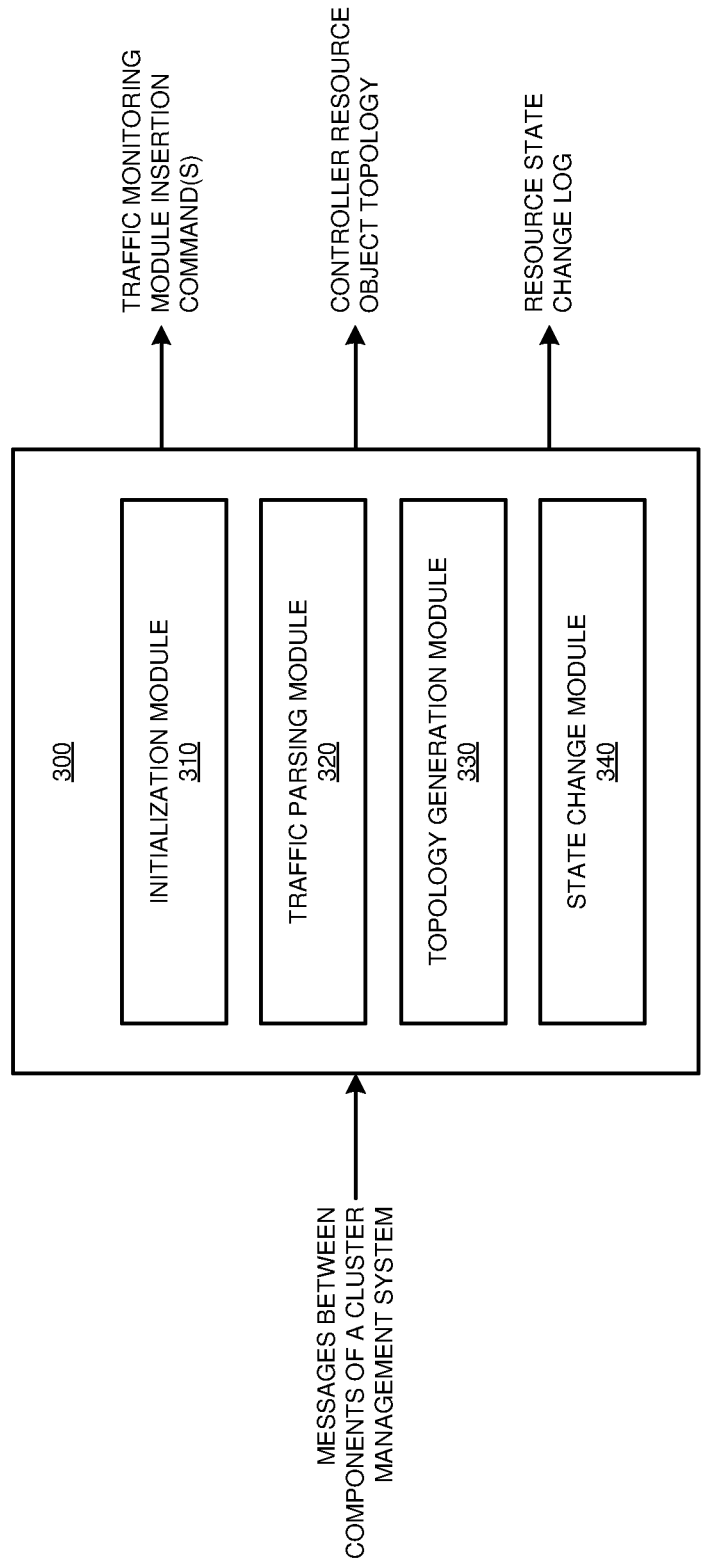
FIG. 3 depicts a block diagram of an example configuration for controller-resource object topology analysis for cluster configuration management in accordance with an illustrative embodiment.

With reference to FIG. 3, this figure depicts a block diagram of an example configuration for controller-resource object topology analysis for cluster configuration management in accordance with an illustrative embodiment. Application 300 is the same as application 200 in FIG. 1.

In the illustrated embodiment, initialization module 310 inserts, or causes insertion of, a traffic monitoring code module into kernel code of an operating system. One implementation of module 310 uses an eBPF capability within an operating system to insert, during execution of the operating system, a traffic monitoring code module into kernel code of an operating system that supports eBPF. Another implementation of module 310 uses a presently available code development technique to insert a traffic monitoring code module into kernel code of an operating system prior to execution of the operating system.

Traffic parsing module 320 uses the traffic monitoring code module to receive a plurality of messages between components of a cluster management system managing a first cluster of systems, and extract a message of interest from the plurality of messages. In particular, module 320 uses a presently available technique, such as an eBPF capability, to register the traffic monitoring code module for execution when triggered by receipt of a message at a socket of the kernel. In one implementation of module 320, the traffic monitoring code module, when triggered, examines an incoming message to determine if the message is of interest. In another implementation of module 320, the traffic monitoring code registers to receive all incoming messages, or all incoming messages matching one or more criteria, at a socket of the kernel, and the traffic monitoring code module examines an incoming message to determine if the message is of interest. In one implementation of module 320, the cluster management system is Kubernetes, and the plurality of messages are HTTP messages between the Kubernetes API server and other Kubernetes objects.

In an implementation of module 320, one message of interest is a resource creation message. A resource creation message is a request to create a resource object. The request identifies a controller that will monitor the resource object. For example, in Kubernetes a resource creation message might be a message from an API server to a mutation webhook.

In an implementation of module 320, one message of interest is a resource status message. A resource status message is a request from a controller for a current status of a resource. The current status of the resource is recorded in the resource object. Two non-limiting examples of a resource status message are the Kubernetes get command (used in the Kubernetes API to request a status of a single resource object) and the Kubernetes list command (used in the Kubernetes API to request a status of each of a collection of resource objects). For example, one Kubernetes get command might be ""GET/api/v1/configmaps/{CM name}", where {CM name} specifies a particular resource represented by a resource object.

In an implementation of module 320, one message of interest is a watch message. A watch message is a request from a controller to report one or more changes in status of a resource represented by a resource object, without a specific request for status. One non-limiting example of a watch message is the Kubernetes watch command (used in the Kubernetes API to request reporting of a sequence of status changes to a particular resource object or collection of resource objects. For example, one Kubernetes watch command might be "GET/api/v1/watch/{CRD name}", where {CRD name} specifies a particular CRD.

In an implementation of module 320, one message of interest is a resource state change message. A resource state change message is a request from a controller to change a status of a resource, as recorded in a resource object representing the resource, from a first status to a second status. State change module 340 uses the contents of one or more resource state change messages to log, in a resource state change log, an identifier of the controller, an identifier of the resource object, the first status, and the second status.

Topology generation module 330 uses one or more extracted messages of interest to construct a controller-resource object topology. A controller-resource object topology identifies a relationship between a resource object and a controller associated with the resource object. A controller associated with the resource object is a controller that has created a resource object, or has requested a status of a resource object either once or on a continuing basis. Module 330 provides the topology to a human expert for use in cluster administration, error analysis, and error remediation. Another implementation of module 330 uses the topology to perform automatic cluster administration, error analysis, and error remediation. One implementation of module 330 uses the topology in migrating the controller and the resource represented by the resource object from the first cluster of systems to a second cluster of systems managed by a second cluster management system. In particular, if the controller is being migrated, the implementation ensures that the resource represented by the resource object is also migrated, and if the resource is being migrated, the implementation ensures that the controller is also migrated, thus preserving the controller-resource object relationship across the migration.

Figure 4:
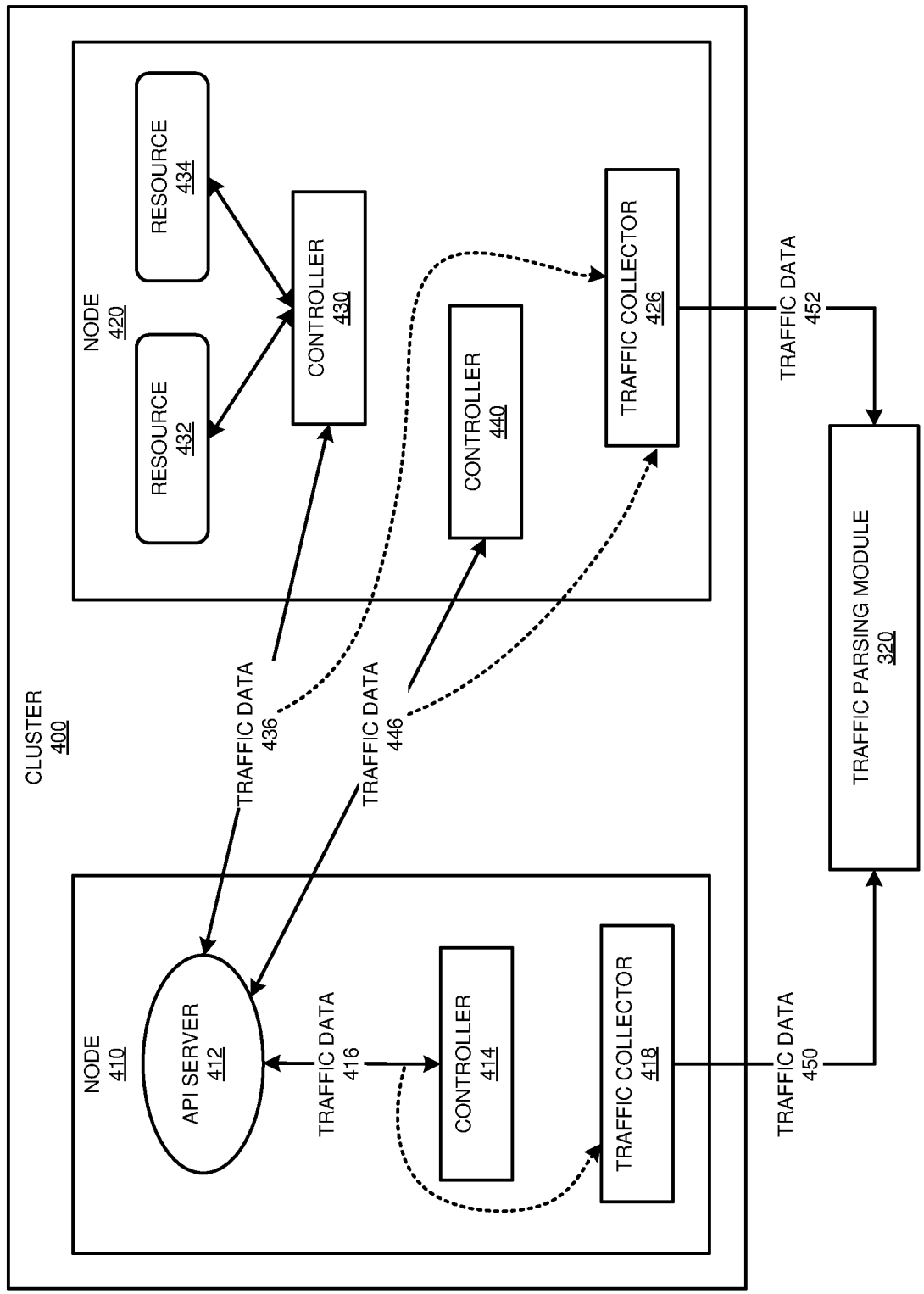
FIG. 4 depicts an example of controller-resource object topology analysis for cluster configuration management in accordance with an illustrative embodiment.

With reference to FIG. 4, this figure depicts an example of controller-resource object topology analysis for cluster configuration management in accordance with an illustrative embodiment. The example can be executed using application 300 in FIG. 3. Traffic parsing module 320 is the same as traffic parsing module 320 in FIG. 3.

As depicted, API server 412 executes in node 410 of cluster 400. Controller 414 also executes in node 410, and controllers 430 and 440 execute in node 420 of cluster 400. Controller 430 controls resources 432 and 434, each represented by a resource object. Traffic collector 418 is a traffic monitoring code module configured to receive traffic data 416, one or more messages between controller 414 and API server 412. Traffic collector 426 is a traffic monitoring code module configured to receive traffic data 436 (one or more messages between controller 430 and API server 412) and traffic data 446 (one or more messages between controller 440 and API server 412). Traffic collector 418 forwards traffic data 450 to traffic parsing module 320. Traffic collector 426 forwards traffic data 452 to traffic parsing module 320.

Figure 5:
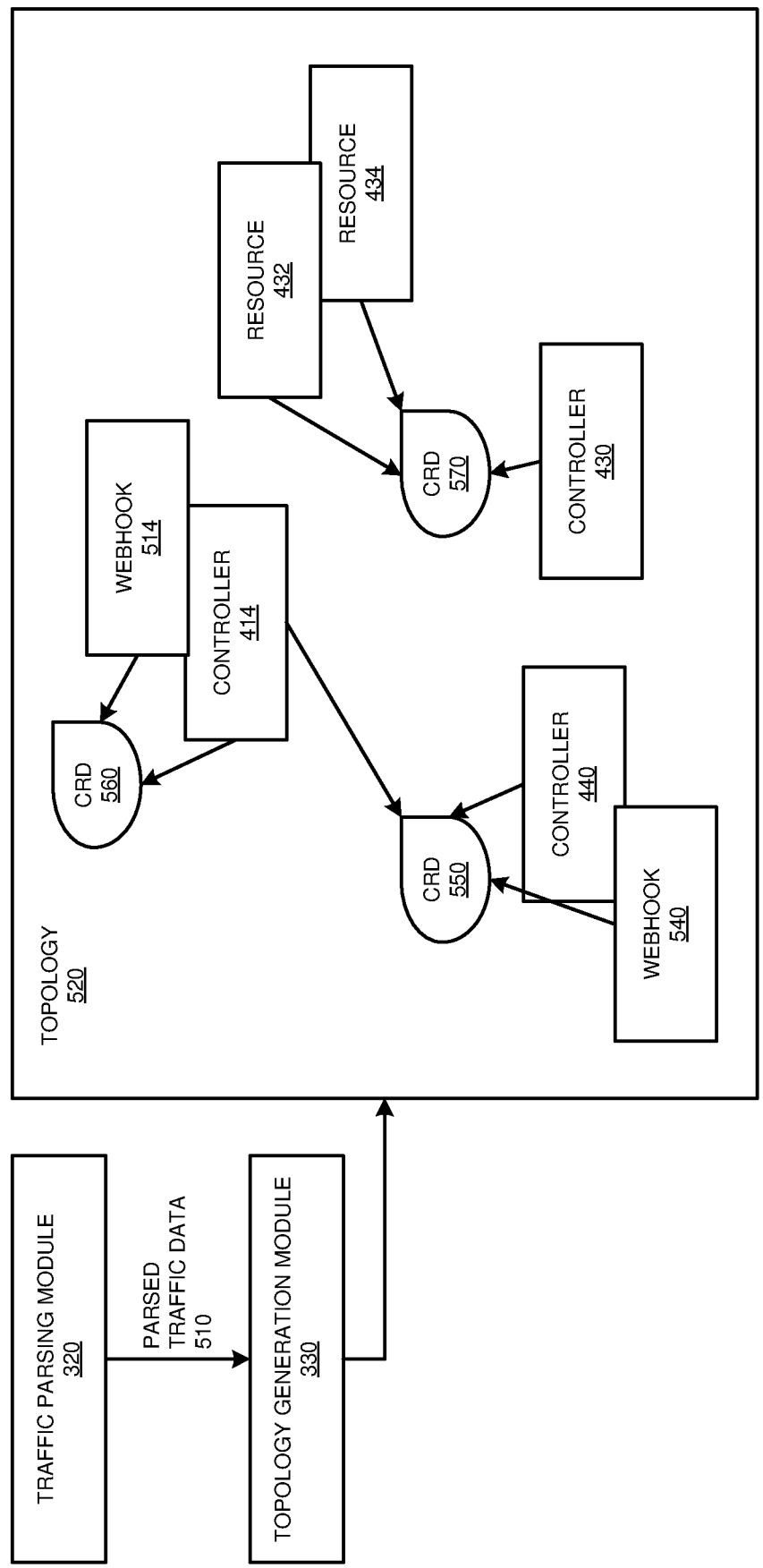
FIG. 5 depicts a continued example of controller-resource object topology analysis for cluster configuration management in accordance with an illustrative embodiment.

With reference to FIG. 5, this figure depicts a continued example of controller-resource object topology analysis for cluster configuration management in accordance with an illustrative embodiment. Traffic parsing module 320 and topology generation module 330 are the same as traffic parsing module 320 and topology generation module 330 in FIG. 3. Controllers 414, 430, and 432 and resources 432 and 434 are the same as controllers 414, 430, and 432 and resources 432 and 434 in FIG. 4.

Traffic parsing module 320 generates parsed traffic data 510, one or more messages of interest. Topology generation module 330 uses parsed traffic data 510 to construct controller-resource object topology 520. Within topology 520, CRD 560 (a resource object) is related to controller 414 and webhook 514. CRD 550 (a resource object) is related to controller 414, controller 550, and webhook 540. Note that two controllers are monitoring the same resource object, CRD 550. CRD 570 (a resource object) is related to controller 430, and resources 432 and 434.

Figure 6:
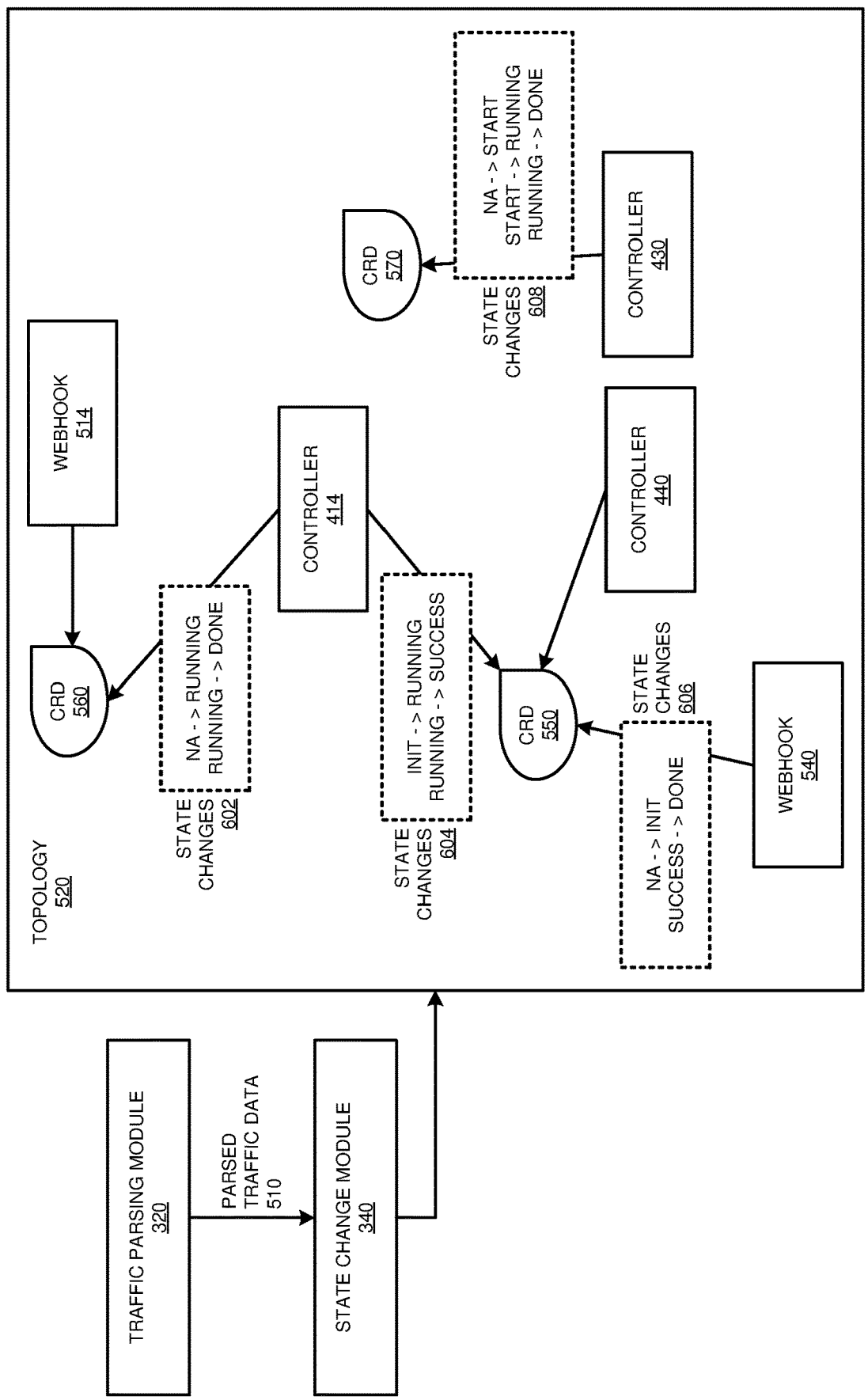
FIG. 6 depicts a continued example of controller-resource object topology analysis for cluster configuration management in accordance with an illustrative embodiment.

With reference to FIG. 6, this figure depicts a continued example of controller-resource object topology analysis for cluster configuration management in accordance with an illustrative embodiment. Traffic parsing module 320 and state change module 340 are the same as traffic parsing module 320 and state change module 340 in FIG. 3. Controllers 414, 430, and 432 and resources 432 and 434 are the same as controllers 414, 430, and 432 and resources 432 and 434 in FIG. 4. Topology 520, CRDs 550, 560, and 570, and webhooks 514 and 540 are the same as topology 520, CRDs 550, 560, and 570, and webhooks 514 and 540 in FIG. 5.

As depicted, state change module 340 has logged state changes 602, 604, 606, and 608. Note that CRD 550 has received state changes 604 and 608, from different sources.

Figure 7:
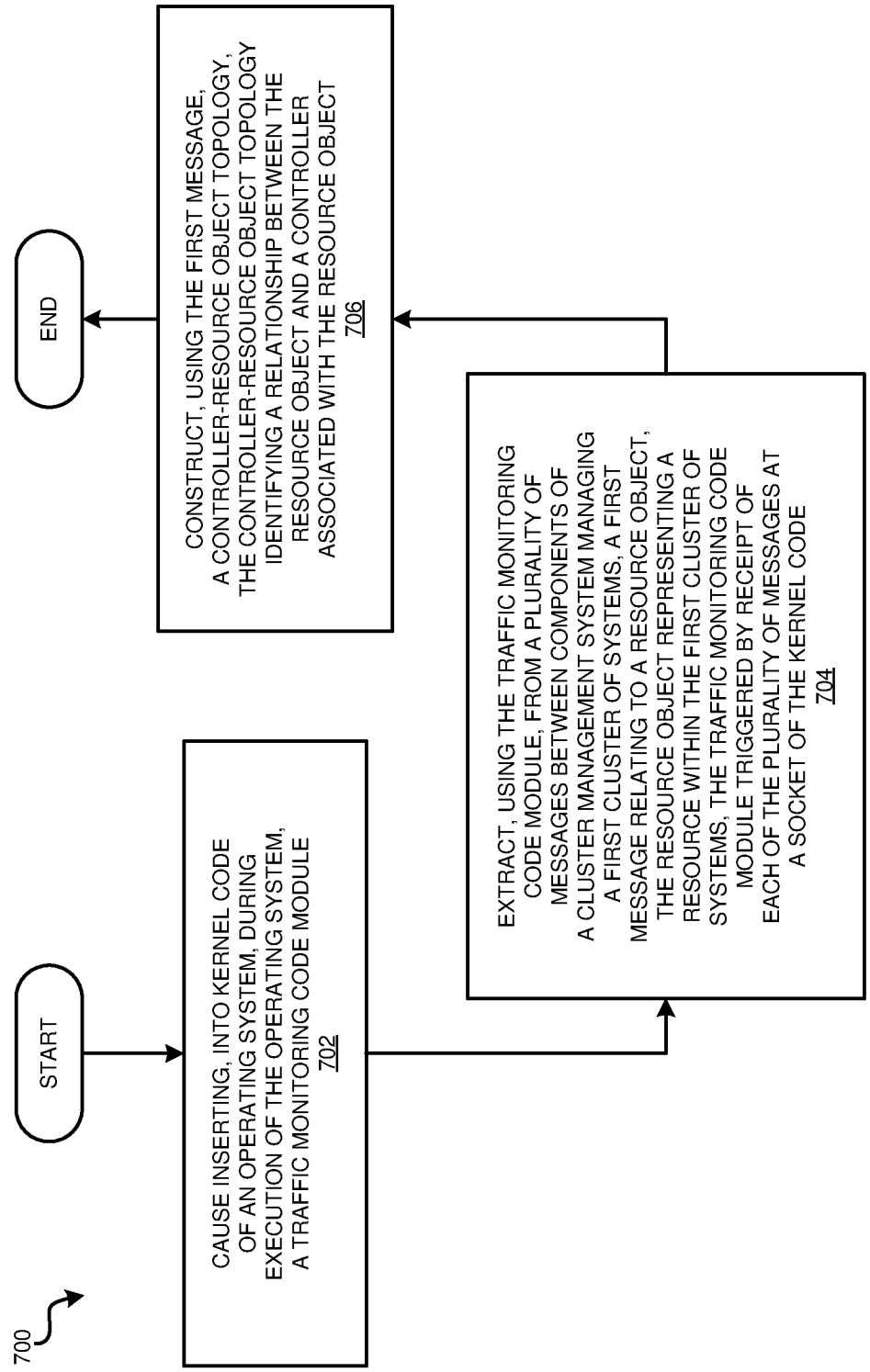
FIG. 7 depicts a flowchart of an example process for controller-resource object topology analysis for cluster configuration management in accordance with an illustrative embodiment.

With reference to FIG. 7, this figure depicts a flowchart of an example process for controller-resource object topology analysis for cluster configuration management in accordance with an illustrative embodiment. Process 700 can be implemented in application 200 in FIG. 3.

In the illustrated embodiment, at block 702, the process causes inserting, into kernel code of an operating system, during execution of the operating system, a traffic monitoring code module. At block 704, the process extracts, using the traffic monitoring code module, from a plurality of messages between components of a cluster management system managing a first cluster of systems, a first message relating to a resource object, the resource object representing a resource within the first cluster of systems, the traffic monitoring code module triggered by receipt of each of the plurality of messages at a socket of the kernel code. module. At block 706, the process constructs, using the first message, a controller-resource object topology, the controller-resource object topology identifying a relationship between the resource object and a controller associated with the resource object. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   causing inserting, into kernel code of an operating system, during execution of the operating system, a traffic monitoring code module, wherein the traffic monitoring code module comprises a traffic collector module, and wherein the traffic collector module is configured to receive traffic data between a controller and an Application Program Interface (API) server executing in a first cluster management system and to forward the traffic data;
   executing the traffic monitoring code module to receive all incoming messages of the traffic data transmitted between the controller and the API server matching one or more criteria at a socket of the kernel code of the operating system;
   extracting, using the traffic monitoring code module, from a plurality of messages transmitted between components of the first cluster management system managing a first cluster of systems, a first message relating to a resource object, wherein the first message of the plurality of messages matches the one or more criteria, wherein the resource object represents a resource within the first cluster of systems, and wherein the traffic monitoring code module is triggered by receipt of each message of the plurality of messages at the socket of the kernel code of the operating system; and
   constructing, using the first message of the plurality of messages, a controller-resource object topology, wherein the controller-resource object topology identifies a relationship between the resource object and a controller associated with the resource object.

2. The computer-implemented method of claim 1, further comprising:
   migrating, to a second cluster of systems managed by a second cluster management system, using the controller-resource object topology, the controller and the resource represented by the resource object.

3. The computer-implemented method of claim 1, wherein the first message of the plurality of messages comprises a resource creation message, wherein the resource creation message comprises a request to create the resource object, and wherein the request identifies the controller.

4. The computer-implemented method of claim 1, wherein the first message of the plurality of messages comprises a resource status message, wherein the resource status message comprises a request from the controller for a current status of the resource, and wherein the current status of the resource is recorded in the resource object.

5. The computer-implemented method of claim 1, wherein the first message of the plurality of messages comprises a watch message, and wherein the watch message comprises a request from the controller to report a change in status of the resource represented by the resource object.

6. The computer-implemented method of claim 1, wherein the first message of the plurality of messages comprises a resource state change message, and wherein the resource state change message comprises a request from the controller to change a status of the resource as recorded in the resource object from a first status to a second status.

7. The computer-implemented method of claim 6, further comprising:
   logging, in a resource state change log, an identifier of the controller, an identifier of the resource object, the first status, and the second status.

8. A computer program product comprising one or more computer readable storage media, and program instructions collectively stored on the one or more computer readable storage media, the program instructions executable by a processor to cause the processor to perform operations comprising:
   causing inserting, into kernel code of an operating system, during execution of the operating system, a traffic monitoring code module, wherein the traffic monitoring code module comprises a traffic collector module, and wherein the traffic collector module is configured to receive traffic data between a controller and an Application Program Interface (API) server executing in a first cluster management system and to forward the traffic data;
   executing the traffic monitoring code module to receive all incoming messages of the traffic data transmitted between the controller and the API server matching one or more criteria at a socket of the kernel code of the operating system;
   extracting, using the traffic monitoring code module, from a plurality of messages transmitted between components of the first cluster management system managing a first cluster of systems, a first message relating to a resource object, wherein the first message of the plurality of messages matches the one or more criteria, wherein the resource object represents a resource within the first cluster of systems, and wherein the traffic monitoring code module is triggered by receipt of each message of the plurality of messages at the socket of the kernel code of the operating system; and
   constructing, using the first message of the plurality of messages, a controller-resource object topology, wherein the controller-resource object topology identifies a relationship between the resource object and a controller associated with the resource object.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the stored program instructions associated with the request; and
    program instructions to generate an invoice based on the metered use of the stored program instructions associated with the request.

11. The computer program product of claim 8, further comprising:
    migrating, to a second cluster of systems managed by a second cluster management system, using the controller-resource object topology, the controller and the resource represented by the resource object.

12. The computer program product of claim 8, wherein the first message of the plurality of messages comprises a resource creation message, wherein the resource creation message comprises a request to create the resource object, and wherein the request identifies the controller.

13. The computer program product of claim 8, wherein the first message of the plurality of messages comprises a resource status message, wherein the resource status message comprises a request from the controller for a current status of the resource, and wherein the current status of the resource is recorded in the resource object.

14. The computer program product of claim 8, wherein the first message of the plurality of messages comprises a watch message, and wherein the watch message comprises a request from the controller to report a change in status of the resource represented by the resource object.

15. The computer program product of claim 8, wherein the first message of the plurality of messages comprises a resource state change message, and wherein the resource state change message comprises a request from the controller to change a status of the resource as recorded in the resource object from a first status to a second status.

16. The computer program product of claim 15, further comprising:
   logging, in a resource state change log, an identifier of the controller, an identifier of the resource object, the first status, and the second status.

17. A computer system comprising a processor and one or more computer readable storage media, and program instructions collectively stored on the one or more computer readable storage media, the program instructions executable by the processor to cause the processor to perform operations comprising:
   causing inserting, into kernel code of an operating system, during execution of the operating system, a traffic monitoring code module, wherein the traffic monitoring code module comprises a traffic collector module, and wherein the traffic collector module is configured to receive traffic data between a controller and an Application Program Interface (API) server executing in a first cluster management system and to forward the traffic data;
   executing the traffic monitoring code module to receive all incoming messages of the traffic data transmitted between the controller and the API server matching one or more criteria at a socket of the kernel code of the operating system;
   extracting, using the traffic monitoring code module, from a plurality of messages transmitted between components of the first cluster management system managing a first cluster of systems, a first message relating to a resource object, wherein the first message of the plurality of messages matches the one or more criteria, wherein the resource object represents a resource within the first cluster of systems, and wherein the traffic monitoring code module is triggered by receipt of each message of the plurality of messages at the socket of the kernel code of the operating system; and
   constructing, using the first message of the plurality of messages, a controller-resource object topology, wherein the controller-resource object topology identifies a relationship between the resource object and a controller associated with the resource object.

18. The computer system of claim 17, further comprising:
   migrating, to a second cluster of systems managed by a second cluster management system, using the controller-resource object topology, the controller and the resource represented by the resource object.

19. The computer system of claim 17, wherein the first message of the plurality of messages comprises a resource creation message, wherein the resource creation message comprises a request to create the resource object, and wherein the request identifies the controller.

20. The computer system of claim 17, wherein the first message of the plurality of messages comprises a resource status message, wherein the resource status message comprises a request from the controller for a current status of the resource, and wherein the current status of the resource is recorded in the resource object.

* * * * *